United States Patent

[11] 3,599,388

| [72] | Inventor | Norman Feingold<br>25 Train Drive, Great Neck, N.Y. 11021 |
|---|---|---|
| [21] | Appl. No. | 787,297 |
| [22] | Filed | Dec. 13, 1968 |
| [45] | Patented | Aug. 17, 1971<br>Continuation-in-part of application Ser. No.<br>726,443, May 3, 1968, now abandoned. |

[54] METHOD OF AND APPARATUS FOR FORMING AND LOADING CONTAINERS
23 Claims, 10 Drawing Figs.

[52] U.S. Cl........................................... 53/29,
53/183
[51] Int. Cl.......................................... B65b 9/08,
B65b 43/04
[50] Field of Search............................. 53/28, 29,
180, 182, 183, 187, 372, 385

[56] References Cited
UNITED STATES PATENTS
3,498,023 3/1970 Reid et al...................... 52/182

| 2,877,609 | 3/1959 | Bodolay et al. | 52/28 |
| 3,182,430 | 5/1965 | Hoeppner | 52/29 |
| 3,319,538 | 5/1967 | Bodolay et al. | 52/28 X |
| 3,462,913 | 8/1969 | Bodolay et al. | 52/183 |

Primary Examiner—Theron E. Condon
Assistant Examiner—E. F. Desmond
Attorney—Darby & Darby ABSTRACT: The present invention includes apparatus for forming plastic bags from plastic sheet material and loading same, the material being folded upon itself to form first and second superimposed layers with a section for supporting and advancing the material during processing, the apparatus including means for engaging and advancing the folded sheet material, means along the path of the material for forming side closures and mouths of adjacent bags, means for thereafter cutting reliefs adjacent each mouth, optional compressed-air means for blowing air into each bag thereby opening each mouth thereof, loading means, and means further along the path of the material for simultaneously sealing each mouth and separating each formed bag from the supporting section.

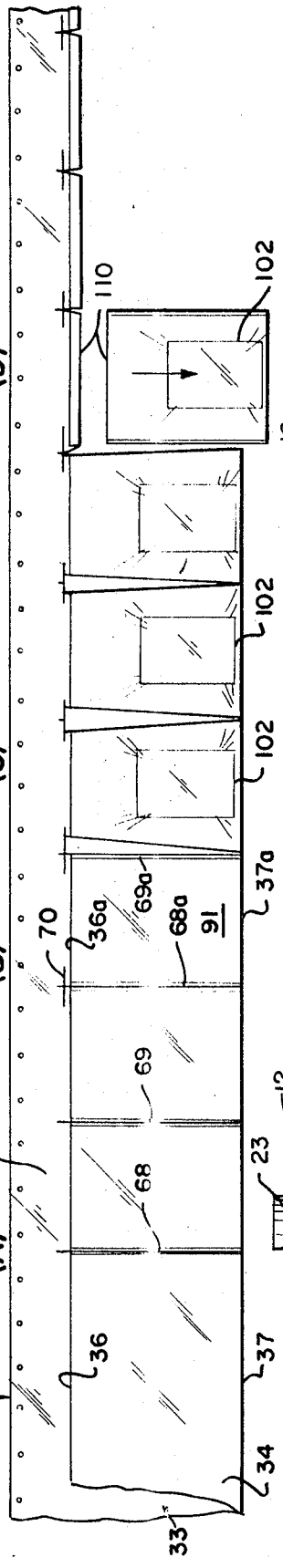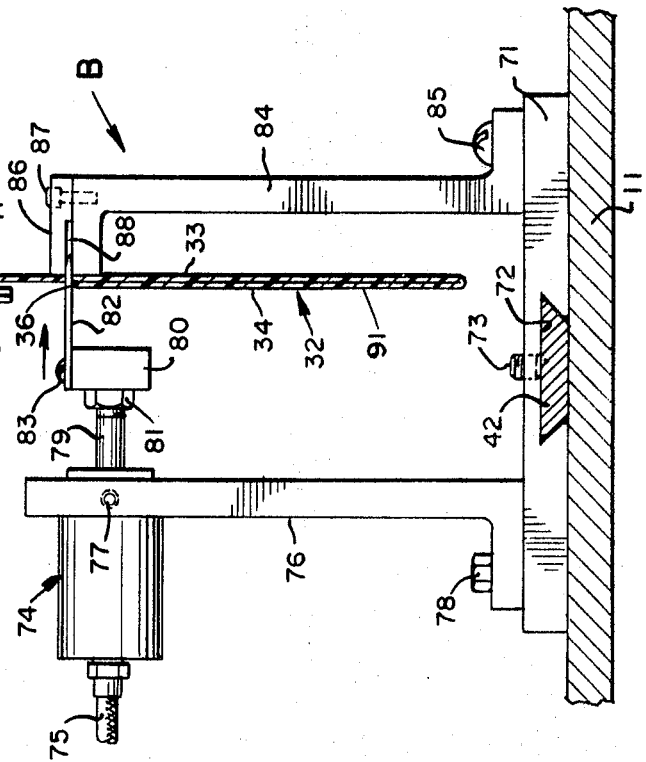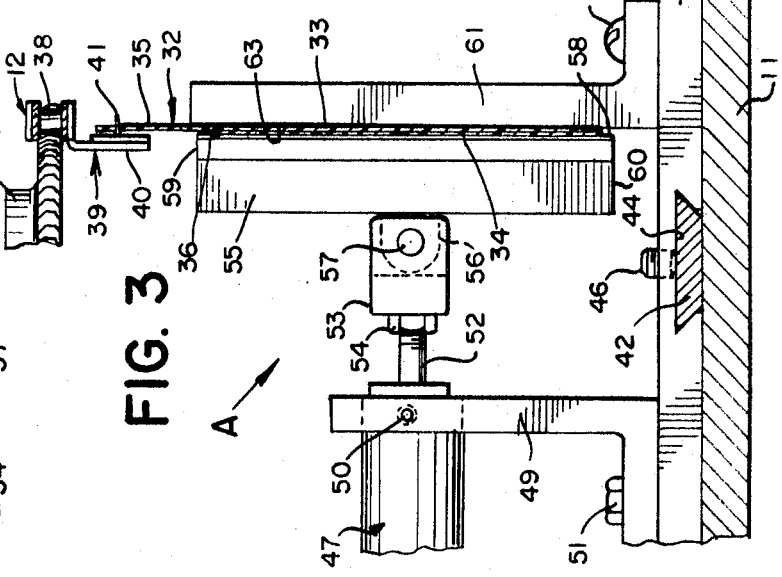

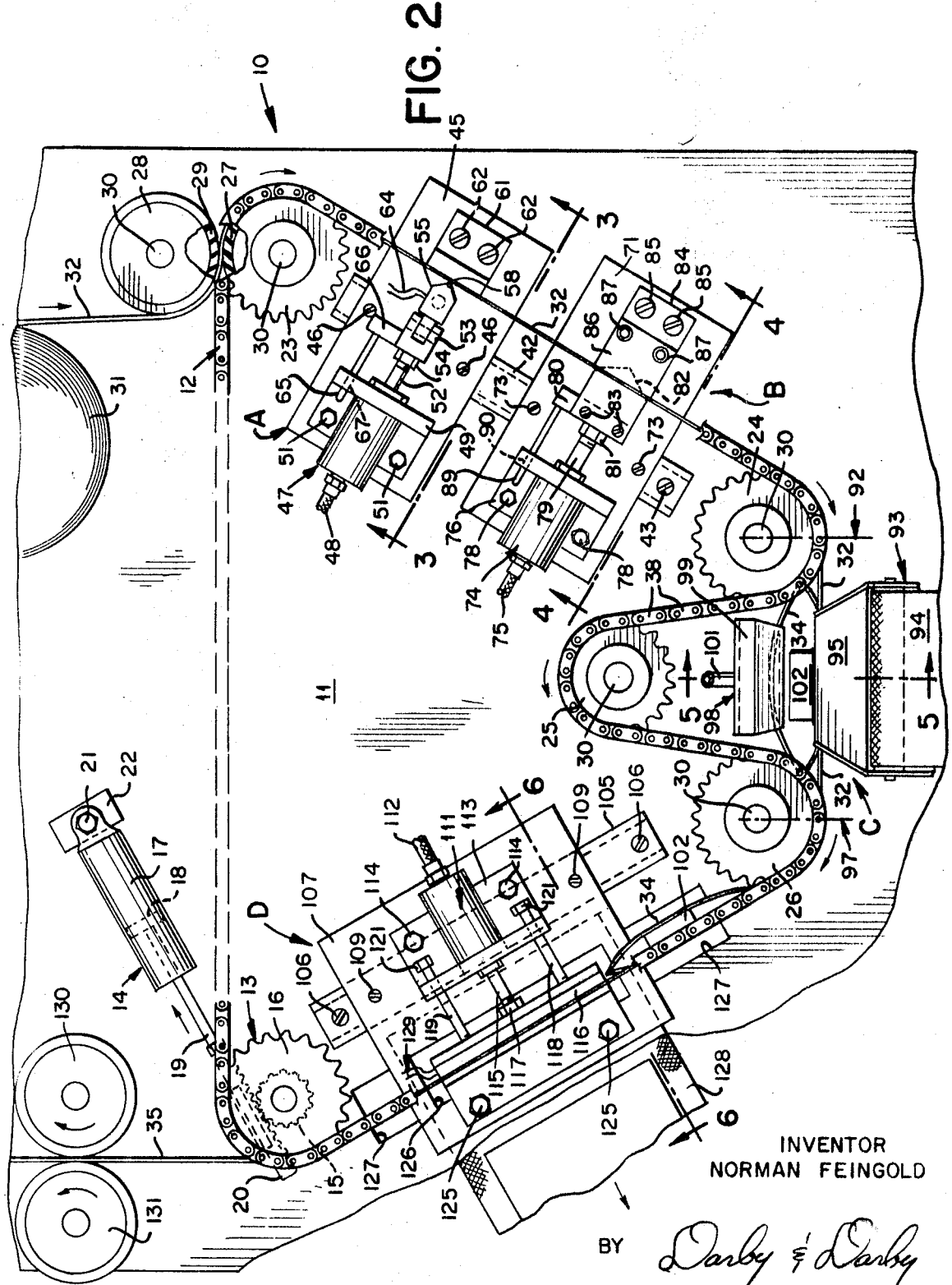

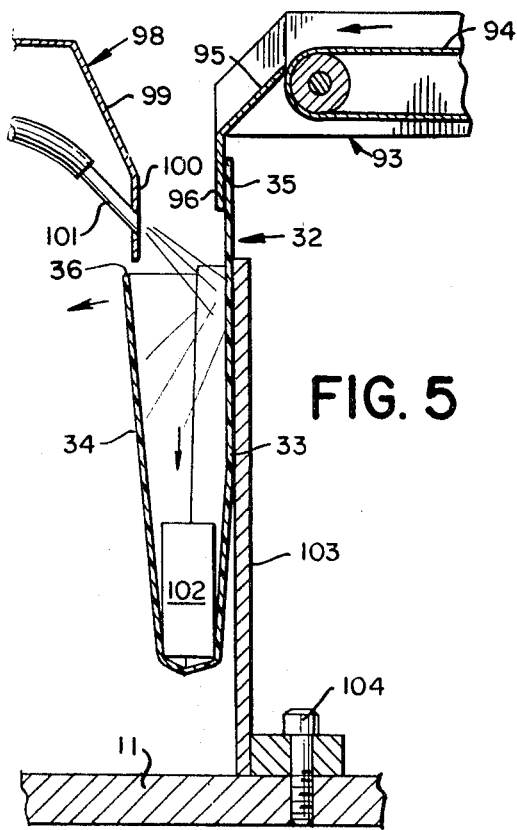
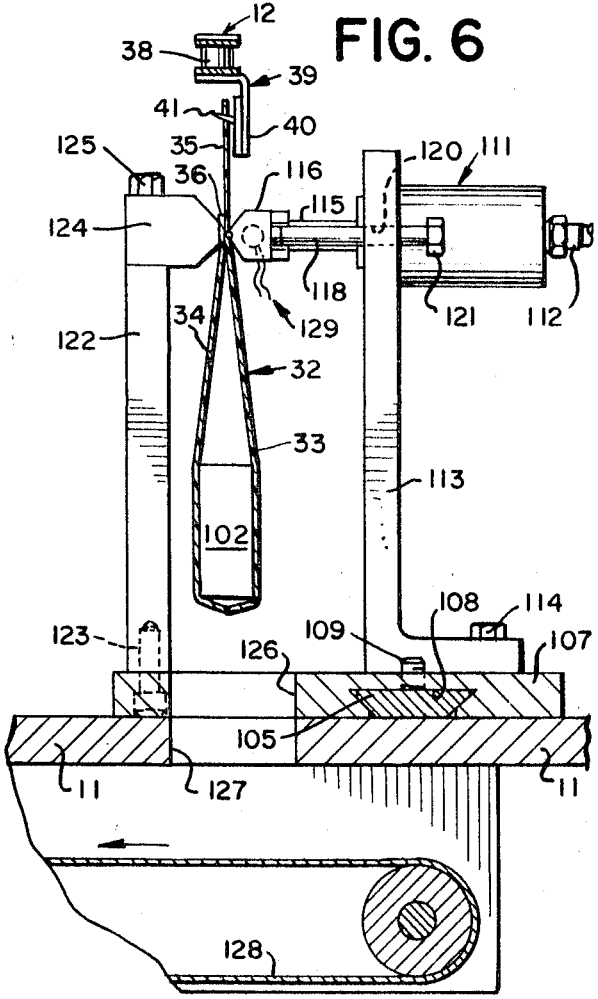
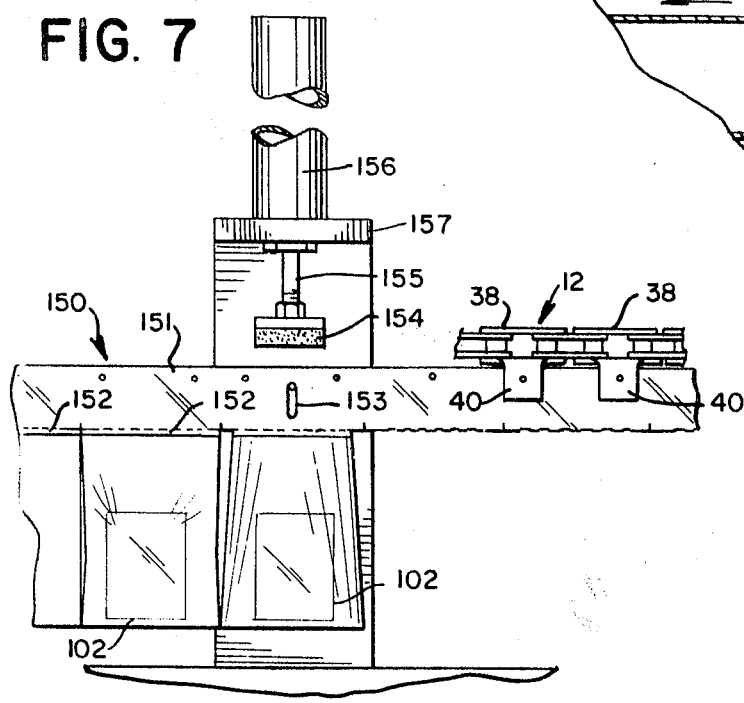

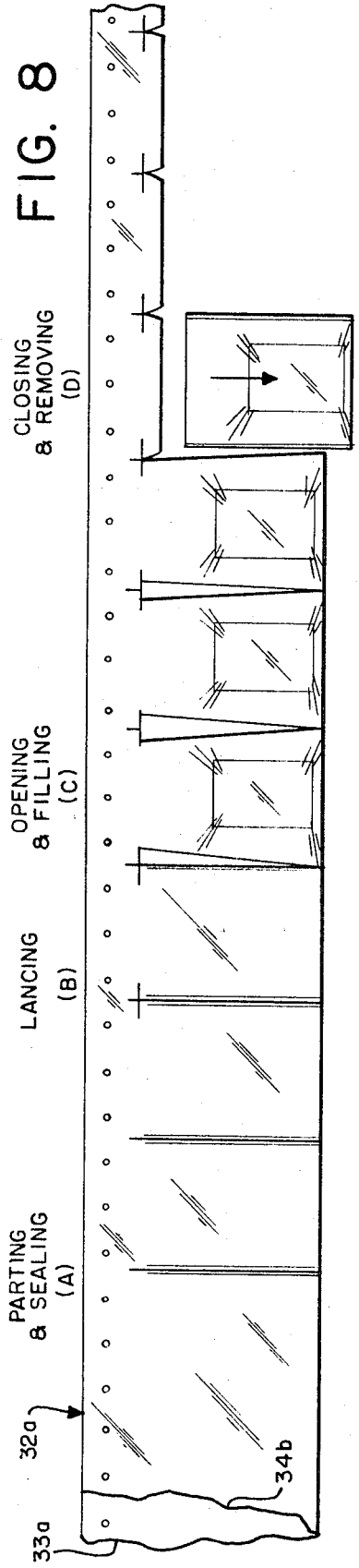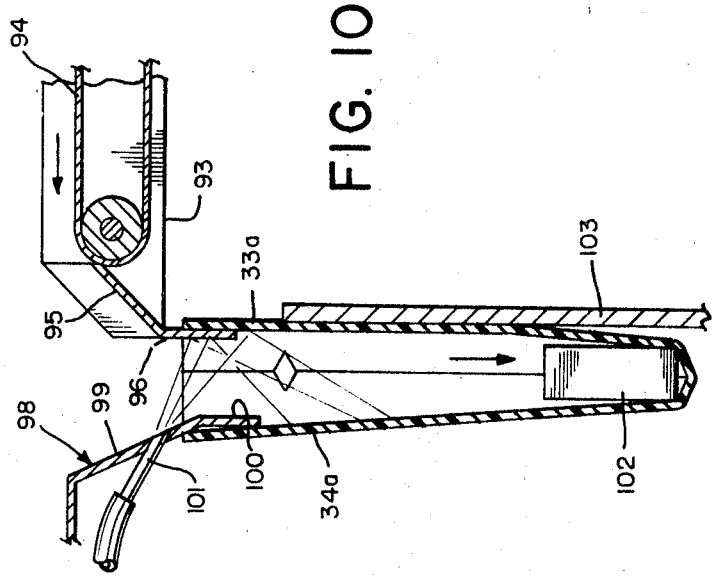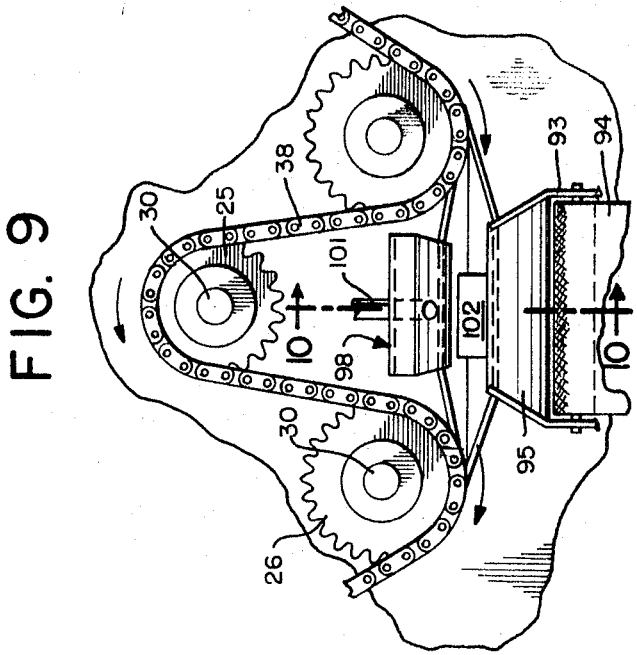

METHOD OF AND APPARATUS FOR FORMING AND LOADING CONTAINERS

This invention relates to the forming and filling of containers and more particularly to a method and apparatus for forming and loading plastic film bags. The present application is a continuation-in-part of my prior application Ser. No. 726,443 filed May 3, 1968, now abandoned.

Plastic film bags, such as the common rectangular polyethylene bag with a filling mouth along one edge, have enjoyed success in the packaging industry. Present commercial methods of bag manufacture and filling, however, are cumbersome and require considerable handling of the bags for purposes of storage and shipment. The fact that bags made of polyethylene are relatively limp makes them difficult to stack, orient and individually select.

Prior solutions to these problems known to the art have included arranging a succession of individual bags in a row having aligned individual protruding lips formed prior to filling and permitting each lip to be individually held while its respective bag is opened and filled. These protruding lips are used to support individual bags and constitute a support for holding stacks of bags. The lip of the individual bag is thereafter folded and sealed to the remainder of the bag, thereby forming part of the filled container, or discarded as excess after sealing of the bag.

Limitations and disadvantages exist in solutions to such problems. Among these is the fact that separate bags must still be individually handled which results in relatively expensive and intricate equipment, susceptible to missed filling, and with speed limitations.

It is an object of the present invention to provide a method and apparatus for forming and loading plastic bags, while held in fixed relative positions by being joined to an integral disposable handling strip or section.

Another object of the present invention is to provide relatively simple and inexpensive apparatus for obviating the above problems. This object is achieved, in part, by a sequence of operations which include handling plastic sheet material folded upon itself either to form a protruding single-ply handling strip or a double-ply handling strip.

A still further object of the present invention is to condition a continuous strip of plastic sheet material folded upon itself and having a handling strip or section, wherein bags are formed by cutting and sealing operations and wherein the handling section, initially integral with each bag, does not form part of the finished bag but is finally discarded.

Yet another object of the present invention is to provide apparatus capable of being adjusted to form and fill plastic bags of varying dimensions.

The present invention fulfills the objects mentioned above and overcomes the limitations and disadvantages of prior art solutions.

The present invention is a method of and means for forming plastic bags from plastic sheet material and loading them. In one form the bags are formed from material folded and partially overlapped lengthwise (i.e., "J-stock" material), and the nonoverlapped portion is utilized to retain the bags in proper relation during the advance of the folded sheet material through the successive steps of cutting and sealing the side edges, lancing the edges to permit bag expansion while loading, and final cutoff. In another form, the bag material is folded or doubled lengthwise with the edges in register, and a portion of the double-thickness material is utilized as the handling section for retaining and advancing the bags during processing.

According to one specific illustrative embodiment of the invention, a conveyor system transports folded plastic sheet stock in the form of a doubled film web in incremental steps. The forming and filling of the bags is accomplished at four basic stations. The first of four basic stations includes means for forming and parting side closures of adjacent bags integral with a protruding handling strip of single-thickness or double-thickness sheet stock. The second station includes means for cutting reliefs adjacent the mouth of each bag. The relief frees strip material to aid in opening each bag. The spacing between the first and second stations may be varied to preselect the dimensions of each bag. The third station includes both means for blowing air into and thereby opening the mouth of each bag (where desirable) and means for successively loading each bag. The fourth station includes means for simultaneously sealing the mouth of each bag and separating such bag from the protruding handling section.

The invention will be more clearly understood from the following description of specific embodiments of the invention together with the accompanying drawings, in which similar reference characters denote similar elements throughout the several views, and in which:

Fig. 1 is a schematic view representing a sequence of operations according to one form of the present invention wherein plastic bags are formed and filled;

FIG. 2 is a fragmentary plan view of one form of apparatus embodying the present invention;

FIG. 3 is a fragmentary sectional elevation view of the parting and sealing station, taken along the line 3–3 of FIG. 2;

FIG. 4 is a fragmentary sectional elevation view of the lancing station, taken along the line 4–4 of FIG. 2;

FIG. 5 is a fragmentary sectional elevation view of the loading station, taken along the line 5–5 of FIG. 2;

FIG. 6 is a fragmentary sectional elevation view of the closing and removing station, taken along the line 6–6 of FIG. 2;

FIG. 7 is a fragmentary elevation view of an alternate feature of the present invention wherein filled plastic bags are separated from a handling strip along perforations formed in the strip.

FIG. 8 is a schematic view similar to FIG. 1, where the sheet or film material is doubled for its full width.

FIG. 9 is a view similar to FIG. 5 for a loading station for use with the doubled material of FIG. 8.

FIG. 10 is cross-sectional view of the station of FIG. 9, seen along line 10–10 thereof.

Before describing in detail a representative mechanism embodying and operating according to the invention, the general principles of the invention are described, with reference to the schematic diagram of FIG. 1.

The sheet material or film from which the package or bag is formed is supplied as a continuous folded web 32. Web 32 is in prefolded form folded longitudinally upon itself at 37, such that a first layer 33 is partially superimposed on a second layer 34 with a strip 35 of first layer 33 extending beyond the upper edge 36 of second layer 34. This produces what is known as "J-stock." Such stock may also be formed by seaming a first layer 33 to a second layer 34 at 37, or by other means. As shown below, in another form of the invention "J-stock" is not used, and the web 32 is folded double upon itself for the entire width.

The web 32 is advanced in fixed incremental steps from left to right in FIG. 1, past four stations A, B, C and D at which operations are performed on the web 32. At stage A, the layer 33 is sealed to the layer 34, and the web is severed from the fold 37 up to a small clearance above the edge 36, in such a way that the layers 33 and 34 remain sealed on either side of the cut. This is illustrated at 68. The web 32 is then advanced step by step by fixed increments corresponding to the desired width of the bag. After each step, a new sealing and severing operation is performed at stage A, preceding operations being indicated at 69 and 68a.

At stage B, a lancing operation is performed. This places a small horizontal cut 70 across vertical cut 68a near the top thereof. As described below, this facilitates opening the bag for loading.

The lanced web 32 then advances to station C at which each bag is filled with the desired contents.

At the subsequent closing and removing station D, the open mouth of the bag is sealed, and the bag severed from the strip 35 which is then discarded.

It will be understood that all four stations operate simultaneously, each contributing its step to the full operation, with the web advancing after each operation, so that, as to any one bag, the operations are performed in sequence.

An important feature of the present invention is the use of the continuous strip 35 which supports each bag and advances it until the very last step is performed, thereby providing simple and positive control over positioning the web for each step in the process.

Referring now in more detail to the drawings, there is shown a representative embodiment of a mechanism for practicing the invention. Referring to FIG. 2, a forming and loading apparatus 10 is shown which has a platform 11 upon which mechanisms located at various stations are supported for accomplishing one or more operations which result in the forming and loading or filling of plastic bags. FIG. 2 shows the four basic stations, A, B, C, and D arranged under the closed-loop path of a link chain 12. Chain 12 is driven by a composite drive gear 13 which, in turn, is caused to rotate by a pneumatic piston and cylinder assembly 14. The composite gear 13 is formed of pinion 15 and sprocket wheel 16 which are coaxially rotatably mounted with respect to platform 11. Conventional clutch means, not shown, limits the rotary movement of sprocket wheel 16 to one direction only. Piston and cylinder assembly 14 includes a cylinder 17 within which a piston assembly 18 is mounted for reciprocatory movement, assembly 18 including an arm 19 extending from cylinder 17. A toothed rack 20 is secured to arm 19 and is disposed such that its teeth matingly engage those of pinion 15. Assembly 14 is suitably supported such as by conventional bolt 21 threaded into support bar 22 which, in turn, is secured to platform 11. Each reciprocatory stroke of piston assembly 18 within cylinder 17 results in rotary advance of sprocket wheel 16 with resulting linear advance of chain 12.

Chain 12 is supported on idler sprocket wheels 23, 24, 25 and 26, respectively. Wheel 23 includes a plastic film-driving portion in the form of annular rubber ring 27 forming an integral part of wheel 23. A backup roller 28 is spaced from wheel 23 such that its rubber ring 29 is normally in contact with or very slightly spaced from annular rubber ring 27. Idler sprocket wheels 23, 24, 25 and 26 as well as backup roller 28 are supported by conventional shafting 30, which may be journaled within portions of platform 11 or supported for rotary movement above the platform.

Chain 12 is made up of a preselected number of links 38, selected links having secured to the underside thereof an angle plate 39 formed with a vertically depending leg 40 to which a spike or pin 41 is fastened (FIG. 3). A plate 39 is secured to sufficient links 38 for proper support and advance of web 32. The supply of sheet material or film is shown in FIG. 2 in the form of a supply roll 31 from which continuous web 32 is fed toward and between rubber rings 27 and 29. Upon being taken from supply roll 31, film web 32 is engaged by rubber rings 27 and 29 at points below protruding handling strip 35, the clockwise movement of rubber ring 27 advancing web 32 between rings 27 and 29 and simultaneously causing handling strip 35 to engage and be penetrated by spikes 41 at spaced intervals therealong. Thus, chain-driven wheel 23 serves as a film-drive roller against backup roller 28 as well as means for detachably securing web 32 to the conveyor chain 12. Spikes 41 constitute means which engage and impart advancing movement to handling strip 35. Other means for positively but detachably securing strip 35 to chain 12 may obviously be used.

A support bar 42 having a dovetail cross-sectional shape seen in FIGS. 3 and 4, is secured to platform 11 by means of fasteners 43. A baseplate 45 is formed with longitudinally extending groove 44 into which support bar 41 is nested such that baseplate 45 is free to slide linearly along bar 42. Bolts 46 are threaded through tapped holes in baseplate 45 such that lower ends thereof engage the upper surface of bar 42, thereby enabling adjustable clamping of the baseplate 45 at selected points along bar 42. Baseplate 45 provides the underlying support means at station A where the initial sealing and separating of web 32 are accomplished. A pneumatic piston and cylinder assembly 47 responsive to compressed air supplied through conduit 48 is counted and held by angle plate 49 by means of setscrew 50. Angle plate 49 is detachably held to baseplate 45 by means of headed bolts 51. A rod 52 extends from the moving part of piston and cylinder assembly 47 and is threaded at its end to clevis member 53 and held fixed by means of locknut 54. A sealing and severing element 55 is connected to clevis member 53 and supported thereby via projection 56 through which clevis pin 57 is guided. FIG. 3 thus shows sealing and severing element 55 mounted for limited pivotal movement desirable for alignment against a suitable backup member. Element 55 includes a relatively small radiused convex working edge 58 extending between ends 59 and 60 thereof. A backup angle plate 61 is secured to baseplate 45 by means of headed bolts 62, angle plate 61 having a substantially vertically upstanding backup bearing surface 63 facing sealing and severing element 55. Electricity is supplied to element 55 through conductors 64, electricity being the source of energy for producing heat to be transmitted through working edge 58 into the film web 32. A guide rod 65 is secured to projection 66 of clevis member 53 and is mounted for sliding movement through a suitable aperture 67 formed in angle plate 49, thereby insuring that element 55 remains in a vertical position and moves perpendicularly with respect to plate 49.

Upon actuation of the sealing and severing apparatus at station A, piston and cylinder assembly 47 causes rod 52 to be urged away from angle plate 49, due to the valved compressed air supplied through conduit 48, into the position shown in FIGS. 1 and 3. In this position, working edge 58 compresses the web layers 33 and 34 against bearing surface 63 of backup angle plate 61 and heat seals them together, thereby simultaneously forming side closures immediately adjacent either side of line 68, for example (FIG. 1) and severing or parting the web 32 along line 68. After the sealing and severing is accomplished, element 55 is withdrawn from film web 32 and the web is advanced by a stroke of pneumatic assembly 14 through a predetermined increment such that the identical operation may be performed again on the web at a position spaced from line 68 by a distance equal to the same increment. Line 69 shows the preceding sealing and partial severing of web 32. It is to be noted that the severing of film web 32 by element 55 extends a slight distance along first layer 33 above the upper edge 36 of second layer 34, this distance being predetermined and fixed.

Upon withdrawal of sealing element 55 from film web 32, chain 12 is advanced such that the portion of web 32 severed and sealed at station A is aligned and depending over lancing station B as shown in FIG. 4. It is at station B that a relief is cut or lanced through strip 35 of first layer 33 along horizontal line 70 as shown in FIG. 1. A baseplate 71 at station B is formed with groove 72 in much the same manner as described for baseplate 45 at station A. Support bar 42 dovetails into groove 72 such that baseplate 71 is free to slide linearly along bar 42. Bolts 73 are threaded through tapped holes in baseplate 71 such that lower ends thereof engage the upper surface of bar 42, thereby enabling adjustable rigid clamping of baseplate 71 along bar 42. It is the adjustability of the spacing between baseplates 45 and 71 in combination with an adjustable advancing stroke that enables the structure of the present invention to form bags of varying dimensions between side closures. A piston and cylinder assembly 74 responsive to compressed air supplied through conduit 75 is mounted and held in angle plate 76 by means of setscrew 77. Angle plate 76 is detachably held to baseplate 71 by means of headed bolts 78. A rod 79 extends from the moving part of piston and cylinder assembly 74 and is threaded at its end such that blade support member 80 may be threaded thereon and held fixed thereto by means of locknut 81. A cutting or lancing blade 82 is secured to support member 80 by means of fasteners 83. Angle plate 84 is spaced from angle plate 76 and is detachably secured to baseplate 71 by means of headed bolts 85. A removable top shear member 86 is bolted by means of fasteners 87 to the uppermost portion of angle plate 84. A relief space 88 is provided between shear member 86 and angle plate 84, which space will accommodate blade 82, the latter entering space 88 during the lancing movement of blade 82 toward and through layer 33 of film strip 32.

In operation, the lancing apparatus at station B is actuated by a valve controlling compressed air which energizes piston and cylinder assembly 74 such that rod 79 thrusts toward angle plate 84, thereby causing blade 82 to impinge on and penetrate first layer 33 of film strip 32 slightly above upper edge 36 of second layer 34. The resulting cutting of first layer 33 is accomplished along a line 70 (FIG. 1) extending perpendicularly to and communicating with an uppermost part of previous vertical severance line 68a. A guide rod 89 is secured to a portion of blade support member 80 and slidably projects through aperture 90 in angle plate 76. Guide rod 89, much like guide rod 65 at station A, insures perpendicular movement of rod 79 with respect to angle plate 76 such that freedom from transverse deflection is achieved. The width and shape of lancing blade 82 may be varied and different blades may be interchanged in order to provide different cutting properties and different dimensions of opening to be cut.

Thus far in the sequence of operations, sealing and severing at station A and the following lancing at station B has resulted in the formation of a bag or container designated 91 in FIG. 1. Bag 91 has a width extending between lines 68a and 69a and a mouth or opening bounded by upper edge 36 and strip 35 of first layer 33. The bottommost portion of bag 91 includes fold 37a.

It is at this point in the sequence of operations that bag 91 is to be opened and filled at station C with a desired object. Idler sprocket wheels 24, 25 and 26 are spaced with their centers at points defining the apices of a triangle, and chain 12 passes successively around these wheels 24, 25 and 26. However, web 32 does not pass around wheel 25, but proceeds directly across from wheel 24 to wheel 26. It will be understood that the web 32 disengages from the chain-supported spikes 41 at wheel 24, and reengages the spikes 41 at wheel 26, so that the web is stretched relatively taut between wheels 24 and 26 to permit the bag opening and filling operation to be performed. At point 92 (FIG. 2) handling strip 35 separates from spikes 41 such that strip 32 passes beneath conveyor 93. As seen in FIG. 5, conveyor 93 includes a driven conveyor belt 94 on which objects to be loaded into successive bags are fed to ramp 95 having a downwardly depending plate 96. Handling strip 35 moves adjacent but behind plate 96 as it progresses from point 92 toward point 97 where handling strip 35 is again engaged by spikes 41. An opposite plate 98 is also formed with a ramp surface 99 terminating in depending portion 100. Ramps 95 and 99 together with plate 96 and depending portion 100 form effectively a funnel which will guide objects delivered by conveyor belt 94 into the bags. Depending portion 100 supports the end of a conduit 101 which delivers compressed air either in spurts or continuously from a blower (not shown) to the mouth of successive bags passing in front of the opening of conduit 101. Air delivered by conduit 101 will open the mouth and body of each bag such that objects 102 may fall through the funnel into the bag. FIG. 5 shows a vertically upstanding angle plate 103 secured to platform 11 by headed bolts 104. Plate 103 serves as a backing for each successive bag as it is both being opened and loaded, thereby preventing the bags from swinging during these operations and controlling the amount each bag may be opened.

After leaving loading station C, loaded web 32 progresses to station D where sealing of each loaded bag is accomplished and the sealed bags are simultaneously severed from handling strip 35. The sealing and severing apparatus at station D (FIG. 6) includes a support bar 105 having a dovetail cross-sectional shape similar to support bar 42. Support bar 105 is secured to platform 11 by means of fasteners 106. A baseplate 107 is formed with groove 108 into which support bar 105 is nested such that baseplate 107 is free to slide linearly along bar 105. Bolts 109 are threaded through tapped holes in baseplate 107 such that lower ends thereof engage the upper surface of bar 105, thereby enabling adjustable rigid clamping of baseplate 107 along bar 105. Baseplate 107 provides the underlying support means at station D for apparatus which simultaneously seals and severs bags along line 110 shown in FIG. 2.

A piston and cylinder assembly 111 responsive to compressed air supplied through conduit 112 is mounted and held by angle plate 113. Plate 113 is detachably held to baseplate 107 by means of headed bolts 114. A rod 115 extends from the moving part of piston and cylinder assembly 111 and is threaded at its end such that sealing and severing element 116 may be threaded thereon and held fixed thereto by means of locknut 117. Guide rods 118 and 119 are threaded at one end into sealing and severing element 116 and extend slidably through apertures 120 in angle plate 113 to stops 121 secured to their opposite ends. Guide rods 118 and 119 insure freedom from transverse movement of sealing and severing element 116 during actuation of piston and cylinder assembly 111. A plate 122 spaced from angle plate 113 is secured to baseplate 107 by fasteners 123. A backup bar 124 is secured to the top of plate 122 as by headed bolts 125. Baseplate 107 is formed with an opening therethrough, which communicates with an opening 127 formed through platform 11. A conveyor belt 128 is located beneath openings 126 and 127 such that severed bags may drop by gravity through openings 126 and 127 onto conveyor belt 128. These bags are thereafter removed to a remote location for further handling as may be desired.

In operation, upon actuation of piston and cylinder assembly 111, rod 115 and sealing and severing element 116 will move toward backup bar 124, thereby engaging and compressing first and second layers 33 and 34 of the bag therebetween while heat is applied through element 116. This heat may be electrically generated via current supplied through conductors 129. The heat generated by element 116 will result in sealing the top of each bag (now containing objects 102) and separating each bag from handling strip 35 so it drops onto conveyor belt 128 as already described.

After separation of the filled bags from handling strip 35 of film web 32, the handling strip is removed from station D by means of drive roller 130 sandwiching lip 35 against idler roller 131. Drive roller 130 is equipped with a conventional slip clutch, not shown. It is to be noted that the handling strip does not form part of the sealed bag, but rather is used to transport and align successive bags as they are formed and filled at the respective stations of the present invention.

In operation, all the pneumatic piston and cylinder actuator arrangements 47, 74 and 111 are actuated simultaneously, and alternately with the drive piston and cylinder arrangement 14, so that after each advance of the sheet material, all of stations A, B and D are actuated simultaneously. The loading conveyor 94 may also be interlocked with the remaining actuators, to prevent actuation of stations A, B and D until an object to be loaded has raised into the funnel arrangement 95, 98, and the advance actuator may be disabled until actuators 47, 74 and 111 have operated. Suitable ways of accomplishing these functions, by microswitches or the like, may be readily devised by anyone of ordinary skill in the art.

The adjustment of the system described to accommodate containers of differing widths may be readily accomplished. The length of the advance of the sheet material is readily adjusted by suitable stops on actuator 14. This essentially determines the width of the resulting package. The separation between sealer-cutter station A and lancer station B must then be set to a multiple of that advance (such a multiple may be zero when the lancing occurs at the same position as the cutting-sealing, or may be one when the two stations are separated by the material-advance distance.) The loader station then has its center spaced from the lancer station by a multiple plus one-half of the advance distance. The sealer-separator station D is spaced a multiple of the advance distance from the lancer (or cutter-sealer) station. Each of these separation distances is readily set, using the loader station as a fixed point from which other positions are located, by moving stations A, B and D to new positions by means of their clamps already described.

In an alternate embodiment of the present invention, it may be desireable to separate successive loaded bags from the handling strip of a film web without sealing the mouths of these loaded bags. FIG. 7 shows the station D for one form of the invention. A web 150 of J-stock having a handling strip 151 is perforated along line 152 thereof, just above edge 36. Compressed air is supplied through conduit 153 to the mouths of successive bags, thereby opening each mouth as already described for conduit 101 at station C. A plunger member 154 is secured to rod 155 of pneumatic piston and cylinder assembly 156 which, in turn, is secured to support plate 157. In operation, compressed air supplied through conduit 153 will open the mouths of successive bags at which time plunger 154 will be caused by piston and cylinder assembly 156 to enter the mouth of each successive bag and engage either the bag or object 102 within each bag to tear the bag from strip 151 at the perforation 152. Alternatively an arrangement such as disclosed in my prior U.S. Pat. No. 3,217,464, granted Nov. 16, 1965, may be used, by which a succession of pusher arms stuff respective objects into the bags, and simultaneously tear each bag from the strip 151 at the perforated line.

While the steps of sealing and severing are most conveniently done simultaneously, as shown at station A, they may be performed separately if desired.

Also, while the sealing-severing and lancing steps have been illustratively shown as being performed at separate stations, they may be combined into one operation performed at a single station, by attaching a cutting blade similar to 82 to the sealing and severing element 55, with a suitable shear member (corresponding to 86) cooperating therewith.

In some circumstances the open pocket formed at the lancing station B and filled at station C may be awkward to handle and to close by sealing at station D. In another form of the invention, the folded film 32a may be formed of equal legs 33a and 34a. This is illustrated in FIG. 8, showing a view similar to that of FIG. 1 for this form.

In this case, the apparatus is the same as in FIGS. 2 to 7, except for the opening and filling station, modified as appears in FIGS. 9 and 10. The modification essentially consists of repositioning the air nozzle 101 higher on the chute walls 100 and 99 so as to clear the upper edge of the film ply 34a. If desired, the air nozzle 101 could be positioned above the chute 98, pointed downwardly into the chute opening.

In this form of the invention, the bag is opened positively by initially threading the film to have its plies 33a, 34a straddle the lower ends of the chute walls 96, 100. The air jet from nozzle 101 principally serves to open the bottom of the bag, and may be unnecessary in some circumstances.

In this form of the invention also, the film is positively transported by the upper, uncut strips of plies 33a, 34a. Both of these strips are secured to the travelling chain 38 by its pins 41, on both sides of the loading station D, and positively determine the posture and feed of the film during the bag forming and filling process.

Here the invention provides an apparatus and method for forming and filling film bags, starting with a roll of doubled film and ending with separate filled and sealed bags, by a single apparatus which serves to form the bags, to position them fixedly during loading, and to advance them positively during the sequence of operations.

Other mechanisms may readily be devised by use of ordinary skill, within the concept of the present invention. For example, the sheet material may pass around a drum which is stepped through fixed angles to advance the material. The various stations are then positioned to operate radially inward or outwardly, at appropriate positions around the drum.

Other embodiments, forms and modifications of the invention coming within the proper scope of the appended claims will of course readily suggest themselves to those skilled in the art.

I claim:

1. A method of forming containers from a longitudinal web of sheet material arranged with first and second superimposed layers joined along a longitudinal edge comprising the steps of supporting said web adjacent the free longitudinal edge opposite said joined edge, sealing said first and second layers along a line which extends transversely from said joined edge partially toward said opposed edge to form side edge closures of containers, severing said layers substantially along said sealing line while leaving an unsevered handling strip, forming a cut through at least one of said layers transversely across each said severing line adjacent said handling strip, and advancing said web by advancing said strip.

2. A method of forming and loading a plurality of containers made from a longitudinal web of sheet material arranged with first and second superimposed layers joined along a longitudinal edge comprising the steps of: sealing and severing said first and second layers along a line which extends transversely from said edge only partially toward the opposed edge to form an unsevered supporting and handling strip, continuously supporting said strip, advancing said strip, repeating said sealing and severing step at another corresponding line of said web, cyclically repeating said steps to form side closures of a plurality of containers, opening and loading each of said containers, and thereafter separating each said container from said strip.

3. A method of forming and loading a plurality of containers made from a longitudinal web of sheet material arranged with first and second superimposed layers joined along a longitudinal edge comprising the steps of: sealing and severing said first and second layers along a line which extends transversely from said edge only partially toward the opposed edge to form an unsevered handling strip, cutting said web along a short line extending perpendicularly from and across said first line at about the end thereof, advancing said strip, repeating said sealing and severing step at another corresponding line of said web, cyclically repeating said steps to form side closures of a plurality of containers, opening and loading each of said containers, and thereafter separating each said container from said strip.

4. A method of forming containers from a longitudinal web of sheet material arranged with first and second superimposed layers joined along a longitudinal edge comprising the steps of supporting said web at substantially all points adjacent the free longitudinal edge opposite said joined edge, sealing said first and second layers along a line which extends transversely from said joined edge only partially toward said opposed edge to form side edge closures of containers, severing said layers substantially along said sealing line while leaving an unsevered supporting and handling strip, thereafter separating said layers adjacent said handling strip by passing said web by a fixed loading chute interposed between said web layers, and advancing said web by stepwise advance of said handling strip.

5. A method as in claim 1 wherein a portion of said first layer extends beyond the free edge of said second layer to form a single-layer handling strip.

6. A method as in claim 1 wherein said first and second layers are substantially coextensive whereby said handling strip is a double layer.

7. The method according to claim 5, wherein said severing includes cutting said first layer a relatively short distance beyond said free edge along an extension of said line.

8. A method as in claim 2 wherein a portion of said first layer extends beyond the free edge of said second layer to form a single-layer handling strip.

9. A method as in claim 2 wherein said first and second layers are substantially coextensive whereby said handling strip is a double layer.

10. The method according to claim 8, wherein said severing includes cutting said first layer a relatively short distance beyond said free edge along an extension of said line.

11. The method according to claim 3, further comprising sealing said two layers together parallel to said web and severing the container from the strip.

12. The method according to claim 3, further comprising the step of tearing said container from said strip along perforations formed therein between said perpendicular cuts, thereby detaching a container from the handling strip.

13. A method of forming and loading a plurality of containers made from sheet material arranged with first and second superimposed layers joined along one longitudinal edge and having a portion along an opposite edge forming a strip used for handling, comprising the steps of: (a) successively and repetitively advancing said strip by a fixed distance thereby to advance said material, (b) sealing and severing said first and second layers at a first position along the path of said material and along a line extending from said one longitudinal edge partially across said material without severing said strip, and thereby forming sealed side edges for containers; (c) at a second position along said path forming a cut in said strip along a short line extending perpendicularly from and across said sealing line; (d) at a third position along said path opening and loading each said container; and (e) at a fourth position along said path severing said container from said strip, said second position being spaced from said first position by a multiple (including zero or one) of said fixed distance of advance, said third position being spaced from said second position by a multiple (including zero or one) of plus one-half of said fixed distance, and said fourth position being spaced from said third position by a multiple (including zero or one) of said fixed distance.

14. The method according to claim 13, further including sealing said container across the top thereof at said fourth position.

15. The method according to claim 13, where all said steps are performed simultaneously after each strip advance.

16. The method according to claim 13, where the separations between said positions are adjustable to select a desired container width.

17. Apparatus for forming containers from sheet material arranged with first and second superimposed layers having a portion forming a strip for handling, comprising means for positively and continuously engaging said handling strip, at substantially all points along its working length, means for driving said engaging means to advance said material, means for sealing and severing said first and second layers along a first line which extends only partially across said material substantially to said strip, while supporting said material by said handling strip, said sealing and severing forming side edge closures of containers, means thereafter loading said containers, and means then sealing said containers between said side edges and severing said loaded containers from said handling strip.

18. Apparatus for forming containers from sheet material arranged with first and second superimposed layers having a portion forming a strip for handling, comprising means for positively and continuously engaging said handling strip over substantially its entire length, means for driving said engaging means to advance said material, and means for sealing and severing said first and second layers along a first line which extends only partially across said material substantially transversely to said strip, said sealing and severing forming side edge closures of containers, said apparatus further comprising means for slitting said material along a short second line extending perpendicularly from and communicating with said first line.

19. Apparatus according to claim 18, further comprising means for opening the mouth of each container.

20. Apparatus according to claim 18, further comprising means for loading each container.

21. Apparatus according to claim 20, further comprising means for sealing said mouth of a loaded container and separating said loaded container from said handling strip.

22. Apparatus according to claim 20, wherein said handling strip is formed with perforations along said strip and further comprising means for separating a loaded container from the handling strip along said perforations.

23. Apparatus according to claim 21, further comprising means for actuating said driving means intermittently and repetitively, and means for simultaneously actuating said sealing and severing means, said slitting means, said loading means and said mouth-sealing means after each actuation of said driving means and at spaced points along the path of said sheet material.